United States Patent
Isobe et al.

(10) Patent No.: US 6,968,813 B2
(45) Date of Patent: Nov. 29, 2005

(54) ELECTROMAGNETIC SPOOL VALVE (75) Inventors: Eiji Isobe, Kariya (JP); Takashi Yamaguchi, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/013,796

(22) Filed: Dec. 17, 2004

(65) Prior Publication Data

US 2005/0139180 A1 Jun. 30, 2005

(30) Foreign Application Priority Data

Dec. 26, 2003 (JP) ............................. 2003-433482

(51) Int. Cl.[7] ................................................ F01L 9/04

(52) U.S. Cl. ................................ 123/90.11; 123/90.15; 123/198 F; 251/129.01

(58) Field of Search .......................... 123/90.12, 90.13, 123/90.15, 90.16, 90.14, 90.18, 193.3, 193.5, 123/195 C, 198 F, 90.11; 464/160; 251/12, 251/129.01, 129.15

(56) References Cited

U.S. PATENT DOCUMENTS

| 6,129,060 | A | * | 10/2000 | Koda .......................... 123/90.17 |
| 6,289,859 | B1 | * | 9/2001 | Fujii et al. ................. 123/90.15 |
| 6,810,842 | B2 | | 11/2004 | Itou | |
| 2003/0047699 | A1 | | 3/2003 | Sakata et al. | |

* cited by examiner

*Primary Examiner*—Thomas Denion
*Assistant Examiner*—Ching Chang
(74) *Attorney, Agent, or Firm*—Nixon & Vanderhye P.C.

(57) ABSTRACT

An electromagnetic spool valve includes a spool valve, an electromagnetic actuator, and a bracket. The spool valve includes a cylindrical sleeve and a spool. The cylindrical sleeve includes an input/output ports for fluid to flow through. The spool is axially slidable in the sleeve. The electromagnetic actuator is fixed to the spool valve for axially driving the spool. The bracket is welded to the electromagnetic actuator. The spool valve is disposed in a fixing member and is fixed thereto by a tightening member tightening the bracket welded to the yoke to the fixing member. Either the bracket or the electromagnetic actuator includes a stopper contact portion for contacting a part of the other to prevent the electromagnetic spool valve from being removed from the sleeve insertion hole.

9 Claims, 5 Drawing Sheets

FIG. 7 though the fixing member is unwelded, thereby conventionally allowing the electromagnetic spool valve to move in a direction for removal from the sleeve insertion hole.

ELECTROMAGNETIC SPOOL VALVE

CROSS REFERENCE TO RELATED APPLICATIONS

This application is based upon and claims the benefit of priority of Japanese Patent Application No. 2003-433482, filed on Dec. 26, 2003, the contents of which are incorporated herein by reference.

FIELD OF THE INVENTION

The present invention relates to an electromagnetic spool valve for driving a spool valve using an electromagnetic actuator and, more particularly, an oil-flow control valve for changing oil-flows with electromagnetic actuator operations.

BACKGROUND OF THE INVENTION

Figure 6:
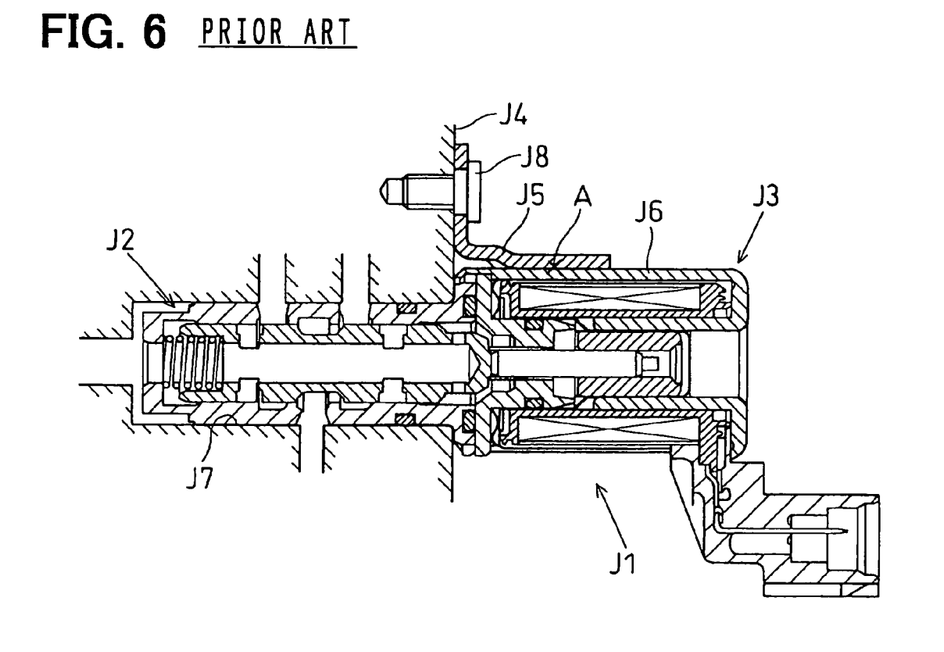
FIG. 6 is a cross-sectional side view of a conventional electromagnetic spool valve attached to an engine.

A conventional electromagnetic spool valve J1 is presented in FIG. 6 and includes a spool valve J2 having a substantially cylindrical exterior and an electromagnetic actuator J3 to drive the spool valve J2. The electromagnetic spool valve J1 is attached with a bracket J5 on a fixing member J4. The bracket J5 is joined to a side surface of the electromagnetic actuator J3, i.e., an outside peripheral surface of a yoke J6 by a weld A generated by means of welding (e.g., resistance welding). The spool valve J2 is inserted into a sleeve insertion hole J7 formed in the fixing member J4, which may be an oil pressure circuit case, an engine, or some similar member. The bracket J5 welded to the yoke J6 is tightened to the fixing member J4 through a tightening member J8 such as a screw, a rivet, or other similar device. In this manner, the electromagnetic spool valve J1 is fixed to the fixing member J4.

Since a fluid pressure (e.g., oil pressure) is applied to the spool valve J2, a force may be applied to the electromagnetic spool valve J1, thereby causing it to be removed from the sleeve insertion hole J7. The weld A between the bracket J5 and the yoke J6 needs to fully withstand the force in the extraction direction.

In order to ensure that the weld A is strong enough to withstand the force in the extraction direction, it is necessary to handle the electromagnetic spool valves J1 during manufacture without destroying the weld A. However, the reliability is affected when the strength of the weld A is handled without destruction. From the viewpoint of costs, it is difficult to handle valves without destructing or compromising the strength of all the welds A.

The present invention has been made in consideration of the foregoing. It is therefore an object of the present invention to prevent extraction of an electromagnetic spool valve from a fixing member by allowing a bracket to contact or interfere with an electromagnetic actuator even in the absence of the weld. This makes it possible to ensure high reliability and prevent costs increased costs associated with delicate handling to ensure the strength at the welds.

SUMMARY OF THE INVENTION

According to the present invention, a bracket is welded to a yoke of an electromagnetic spool valve and is provided with a stopper contact portion. The stopper contact portion contacts the electromagnetic actuator and prevents the electromagnetic spool valve from being removed. The stopper contact portion functions when the bracket tightened to the fixing member is unwelded, thereby conventionally allowing the electromagnetic spool valve to move in a direction for removal from the sleeve insertion hole.

Even though the bracket is unwelded from the yoke, the bracket's stopper contact portion functions to interfere with the electromagnetic actuator. The stopper contact portion can prevent the electromagnetic spool valve from being removed from the sleeve insertion hole.

This makes it possible to ensure a high reliability of fixing the electromagnetic spool valve while suppressing costs associated with delicate handling of the valves to ensure increased weld strength.

According to another aspect of the present invention, a seal groove is formed on the outer periphery of the sleeve toward the electromagnetic actuator of the electromagnetic spool valve. The seal groove is used to attach an O-ring for sealing between the sleeve and the sleeve insertion hole. The bracket is tightened to the fixing member and, when unwelded from the yoke, leaves a contact distance for the electromagnetic spool valve to travel until contacting the stopper contact portion. The contact distance is shorter than a seal distance between an axial sidewall of the seal groove and an axial opening of the sleeve insertion hole when the bracket is tightened to the fixing member and remains welded to the yoke.

According to the construction, the O-ring in the seal groove stays in the sleeve insertion hole even though the yoke and the bracket are unwelded. This construction can prevent fluid (oil and the like) supplied to the spool valve from leaking from the sleeve insertion hole.

According to another aspect of the present invention, the electromagnetic spool valve has the following construction. The bracket is tightened to the fixing member and, when unwelded from the yoke, leaves a contact distance for the electromagnetic spool valve to travel until contacting the stopper contact portion. The contact distance is shorter than an axially overlapping length of apertures for input/output port formed on the sleeve side and an internal channel on the fixing member side.

According to this construction, a communication state is ensured between the sleeve's input/output port and the internal channel on the fixing member even though the yoke and the bracket are unwelded. This ensure proper operation of the electromagnetic spool valve.

According to another aspect of the present invention, the electromagnetic spool valve has the following construction. The bracket is tightened to the fixing member and, when unwelded from the yoke, leaves a contact distance for the electromagnetic spool valve to travel until contacting the stopper contact portion. The contact distance is longer than an axially overlapping length of apertures for the input/output port formed on the sleeve side and an internal channel on the fixing member side.

According to this construction, unwelding the yoke and the bracket disables the communication between the sleeve's input/output port and the internal channel on the fixing member. Consequently, the electromagnetic spool valve function stops.

Stopping the electromagnetic spool valve function activates an error detection system that makes it possible to promptly identify the unwelding between the yoke and the bracket.

According to yet another aspect of the present invention, the electromagnetic spool valve has the following construction. A recess is formed on the side of the yoke. A protrusion is formed on the bracket along the side of the yoke and is to be inserted into the recess. The protrusion formed on the bracket constructs the stopper contact portion.

According to yet another aspect of the present invention, the electromagnetic spool valve has the following construction. A recess is formed on the side of the yoke. A protrusion is formed on the yoke side and is to be inserted into the recess. The recess formed on the bracket constructs the stopper contact portion.

According to yet another aspect of the present invention, the electromagnetic spool valve has the following construction. The bracket is provided with a rear extension, which covers at least part of the electromagnetic actuator reverse to the spool valve. The rear extension constructs the stopper contact portion.

According to still another aspect of the present invention, the electromagnetic spool valve has the following construction. The stopper contact portion is provided at a position to prevent electrical conductivity with the yoke when the yoke is welded to the bracket.

This construction prevents a split welding current from flowing through the stopper contact portion when the yoke and the bracket are resistance-welded. This makes it possible to prevent a welding failure due to the provision of the stopper contact portion.

According to still another aspect of the present invention, an OCV (oil-flow control valve) is provided that can prevent the electromagnetic spool valve from being removed from the sleeve insertion hole. This allows the bracket to interfere with the electromagnetic actuator even when the bracket and the yoke are unwelded. The OCV is combined with a variable valve timing mechanism (hereafter referred to as a VCT). The OCV allows an advance chamber and a delay chamber to relatively apply or exhaust oil pressure generated from a oil pressure source during an operation of the internal combustion engine.

The OCV is used for a variable valve timing mechanism (hereafter referred to as the VVT) comprising an oil pressure circuit and the VCT. The OCV can prevent the electromagnetic spool valve from being removed from the sleeve insertion hole. The use of such OCV can improve the VVT reliability.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

An electromagnetic spool valve according to a preferred embodiment of the present invention includes a substantially cylindrical sleeve, a spool valve having a spool axially movable inside the sleeve, an electromagnetic actuator to drive the spool valve, and a bracket welded to an electromagnetic actuator's yoke.

The electromagnetic spool valve is fixed to a fixing member. To do this, the spool valve is inserted into the sleeve insertion hole formed in the fixing member. The bracket welded to the yoke is tightened to the fixing member by means of a tightening member.

The bracket is provided with a stopper contact portion. When tightened to the fixing member, the bracket may be disconnected from the yoke at the weld. When the electromagnetic spool valve moves in such a direction as to be removed from the sleeve insertion hole, the stopper contact portion contacts with part of the electromagnetic actuator to prevent the electromagnetic spool valve from being extracted.

Figure 1A:
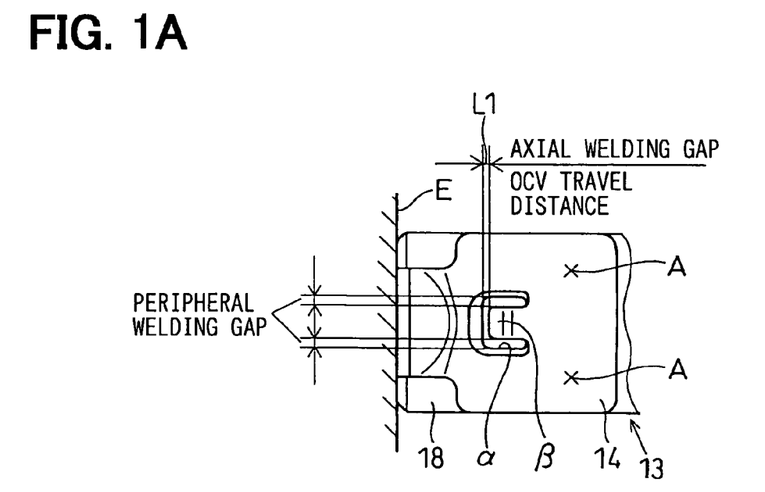
FIG. 1A is a top view of an electromagnetic spool valve according to the principles of the present invention assembled to an engine.
Figure 1B:
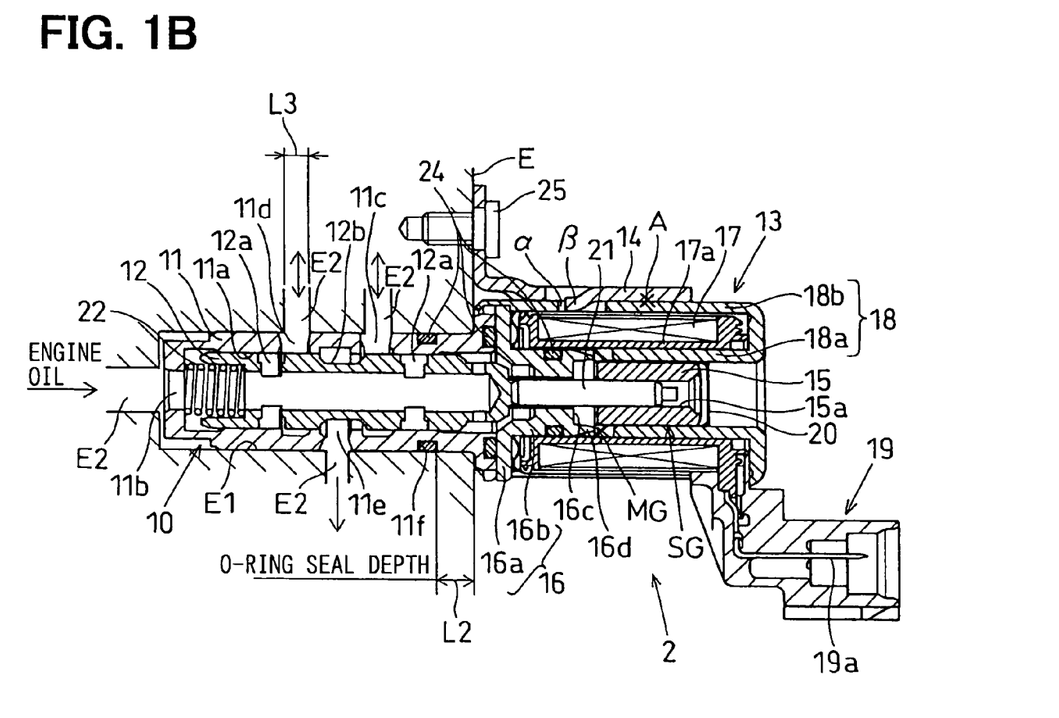
FIG. 1B is a cross-sectional side view of a first embodiment of the electromagnetic spool valve of FIG. 1A.
Figure 2:
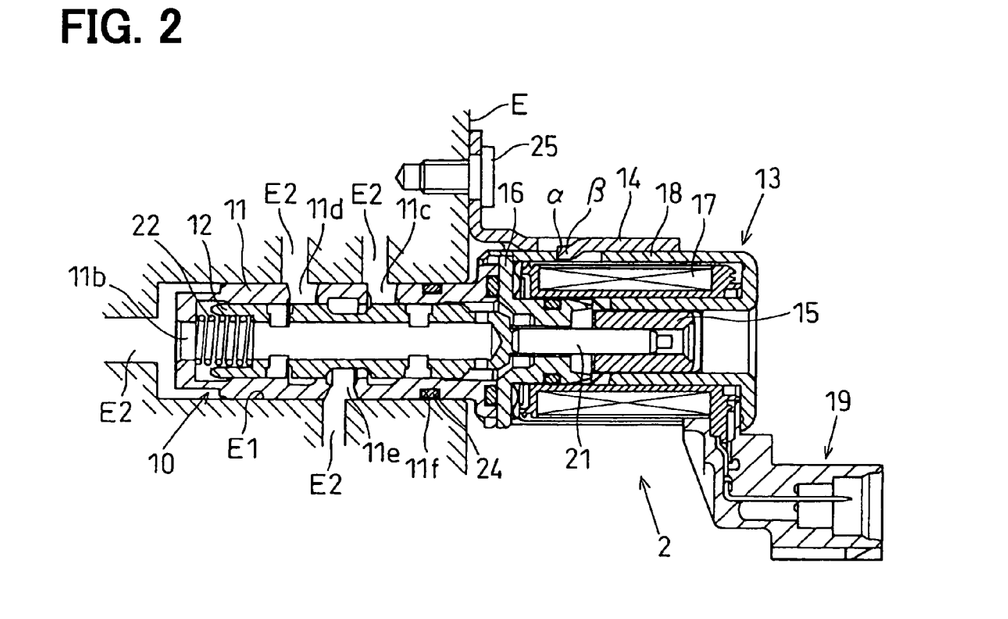
FIG. 2 is a cross-sectional side view of the electromagnetic spool valve of FIG. 1B in a state where a protrusion contacts with a recess.
Figure 3:
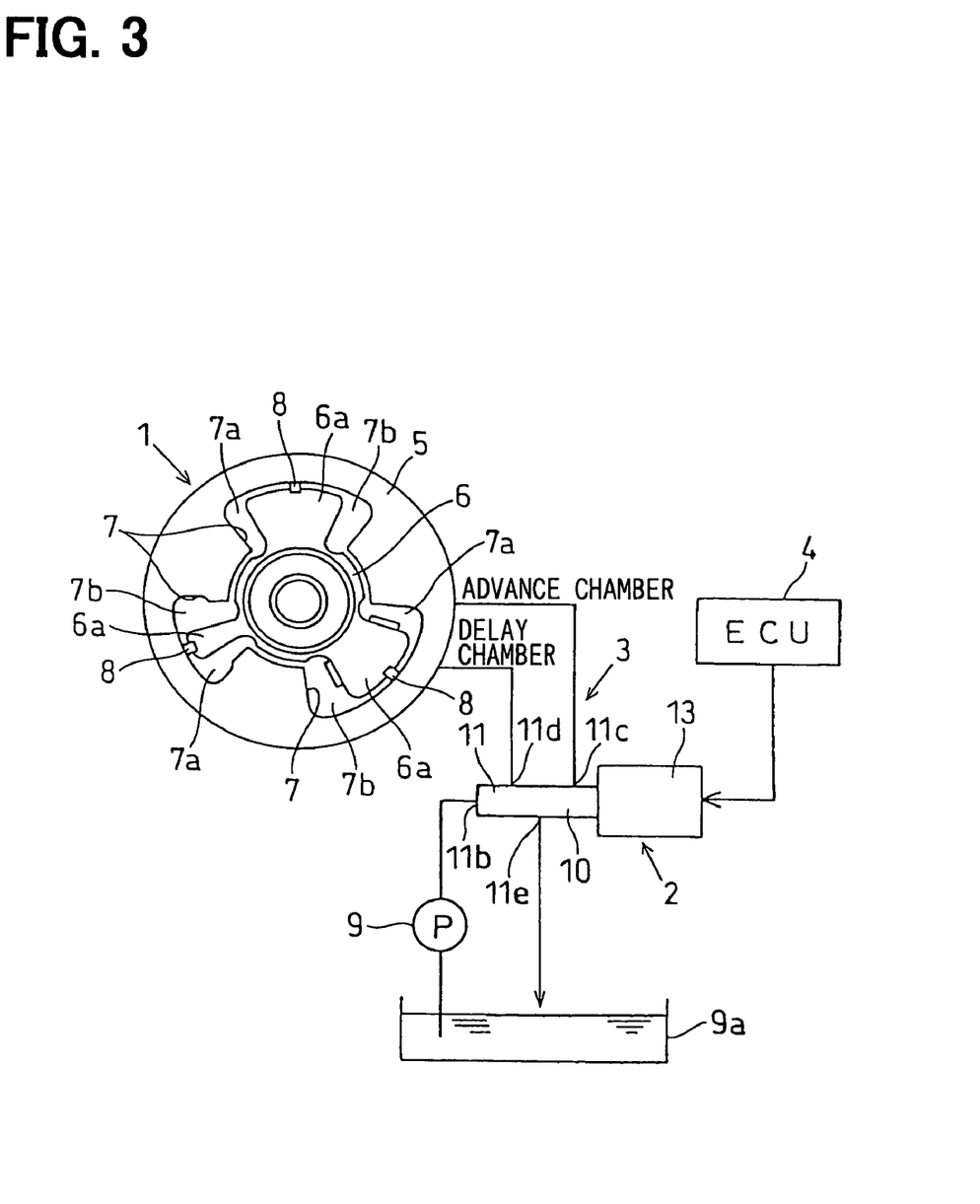
FIG. 3 is a schematic diagram of a variable valve timing mechanism according to the electromagnetic spool valve of FIG. 1B.

Referring now to FIGS. 1 through 3, a first embodiment of an electromagnetic spool valve according to the principles of the present invention and applied to an OCV used for a VVT's oil pressure circuit is described.

The VVT will be described with reference to FIG. 3.

The VVT is attached to a camshaft (any of an intake valve camshaft, an exhaust valve camshaft, and an intake and exhaust camshaft) of an internal combustion engine (hereafter referred to as an engine). The VVT can continuously change timings of opening and closing the valve.

The VVT comprises a VCT 1, an oil pressure circuit 3 having an OCV 2, and an ECU (electric control unit) 4 to control the OCV 2.

The VCT 1 includes a shoe housing 5 (equivalent to a rotatably driving portion) rotatably driven in synchronization with the engine's crankshaft, and a vane rotor 6 (equivalent to a rotatably driven portion) that is rotatably supported in the shoe housing 5 and rotates integrally with the camshaft. The VCT 1 allows a hydraulic actuator constructed in the shoe housing 5 to rotatably drive the vane rotor 6 relative to the shoe housing 5 and vary the camshaft toward an advance side or a delay side.

The shoe housing 5 is coupled to a sprocket with bolts and rotates integrally with the sprocket, which is rotatably driven by the engine's crankshaft via a timing belt or a timing chain. As shown in FIG. 3, a plurality of approximately fan-shaped recesses (three recesses in embodiment 1) 7 are formed in the shoe housing 5. In FIG. 3, the shoe housing 5 rotates clockwise, i.e., in an advance direction.

The vane rotor 6 is positioned to the camshaft end with a positioning pin or similar device and is fixed to the camshaft end with a bolt or similar device. The vane rotor 6 rotates integrally with the camshaft.

The vane rotor 6 has a vane 6a that divides the inside of the recess 7 of the shoe housing 5 into an advance chamber 7a and a delay chamber 7b. The vane rotor 6 is rotatably provided at a specified angle against the shoe housing 5.

The advance chamber 7a is an oil pressure chamber that drives the vane 6a toward the advance side by means of oil pressure and is formed inside the recess 7 toward a reverse rotation of the vane 6a. By contrast, the delay chamber 7b is an oil pressure chamber that drives the vane 6a toward the delay side by means of oil pressure. A seal member 8 maintains liquid tightness inside each of the chambers 7a and 7b.

The oil pressure circuit 3 supplies or exhausts oil from the advance chamber 7a and the delay chamber 7b, generating an oil pressure difference between the advance chamber 7a and the delay chamber 7b, and rotating the vane rotor 6 relative to the shoe housing 5. The oil pressure circuit 3 includes an oil pump 9 driven by the crankshaft and an OCV 2 that selectively supplies oil pressure-fed by the oil pump 9 to the advance chamber 7a or the delay chamber 7b.

The structure of the OCV 2 will be described with reference to FIG. 1B.

The OCV 2 includes a spool valve 10 composed of a sleeve 11 and a spool 12, and an electromagnetic actuator 13 to axially drive the spool 12. The OCV 2 has a bracket 14 to fix the OCV 2 to an engine E (equivalent to the fixing member) where an oil pressure channel (equivalent to an internal channel) is formed.

The sleeve 11 is approximately shaped to be an axially extending cylinder. A plurality of input/output ports are formed on the sleeve 11. Specifically, the sleeve 11 according to the first embodiment is includes a through-hole 11a to axially and slidably support the spool 12, an oil pressure supply port 11b communicating with a discharge port of an oil pump 19, an advance chamber communicating port 11c communicating with the advance chamber 7a, a delay chamber communicating port 11d communicating with the delay chamber 7b, and a drain port 11e to return oil into an oil pan 9a.

The oil pressure supply port 11b is a hole formed in the end surface of the sleeve 11. The other input/output ports are holes formed in the side of the sleeve 11. The delay chamber communicating port 11d, the drain port 11e, and the advance chamber communicating port 11c are formed from the left (far from a coil) to the right (toward the coil), as shown in FIG. 1B.

The spool 12 is approximately a cylinder with a closed end toward the electromagnetic actuator 13. An outside diameter of the spool 12 almost corresponds to an inside diameter (a diameter of the through-hole 11a) of the sleeve 11. The spool 12 is axially slidably supported in the sleeve 11.

Oil pressure selection ports 12a are formed on both axial sides of the spool 12 and have inside and outside peripheries communicating with each other. The oil pressure selection port 12a always communicates with the oil pressure supply port 11b to be supplied with oil pressure through the inside of the spool 12. As shown in FIG. 1B, the left oil pressure selection port 12a may communicate with the delay chamber communicating port 11d to supply oil pressure to the delay chamber 7b. In this case, the right oil pressure selection port 12a is disconnected from the advance chamber communicating port 11c. By contrast, the right oil pressure selection port 12a may communicate with the advance chamber communicating port 11c to supply oil pressure to the delay chamber 7a. In this case, the left oil pressure selection port 12a is disconnected from the delay chamber communicating port 11d.

A depressurization selection groove 12b is formed on a full outer periphery of the spool 12 approximately at the center. The depressurization selection groove 12b always connects with the drain port 11e. As shown in FIG. 1B, when the oil pressure supply port 1b is disconnected from the advance chamber communicating port 1c, the depressurization selection groove 12b connects with the advance chamber communicating port 11c to depressurize the oil pressure of the advance chamber 7a. By contrast, when the oil pressure supply port 11b is disconnected from the delay chamber communicating port 11d, the depressurization selection groove 12b connects with the delay chamber communicating port 11d to depressurize the oil pressure of the delay chamber 7b.

The electromagnetic actuator 13 is provided with a plunger 15, a stator 16, a coil 17, a yoke 18, and a connector 19.

The plunger 15 is made of magnetic metal (e.g., iron, a ferromagnetic material constituting a magnetic circuit) magnetically attracted by the stator 16. The plunger 15 is axially slidably supported inside the stator 16 (specifically inside a cup guide 20 for oil sealing).

The stator 16 is magnetic metal (e.g., iron, a ferromagnetic material constituting a magnetic circuit) including a disk-like section 16a sandwiched between the sleeve 11 and the coil 17 and a cylindrical section 16b that guides a magnetic flux of the disk-like section 16a near the plunger 15. A magnetically attracting gap MG (main gap) is formed between the plunger 15 and the cylindrical section 16b.

A recess 16c is formed at the end of the cylindrical section 16b so as to allow the end of the plunger to be inserted without contact. The recess 16c is provided so that the plunger 15 and the stator 16 partially cross axially. A taper 16d is formed at the end of the cylindrical section 16b so that a magnetic attraction force does not vary with a stroke amount of the plunger 15.

The coil 17, when electrified, functions as magnetism generation means for generating magnetism and allowing the stator 16 to magnetically attract the plunger 15. The coil 17 is formed by winding an enameled wire around a resin bobbin 17a many times.

The yoke 18 is magnetic metal (e.g., iron, a ferromagnetic material constituting a magnetic circuit) and includes an inside cylinder 18a to cover the plunger 15 and an outside cylinder 18b to cover the coil 17. The yoke 18 is joined to the sleeve 11 by fastening a nail formed at the left in FIG. 1B. The inside cylinder 18a interchanges a magnetic flux with the plunger 15. A magnetic flux interchange gap SG (side gap) is formed between the plunger 15 and the inside cylinder 18a.

The connector 19 makes an electrical connection with the ECU 4 via a connection line. The connector 19 contains terminals 19a connected to both ends of the coil 17.

The OCV 2 transmits leftward movement of the plunger 15 in FIG. 1B to the spool 12. The OCV 2 includes a shaft 21 that transmits rightward movement of the spool 12 in FIG. 1B and a spring 22 (equivalent to actuating means) that presses the spool 12 and the plunger 15 in such a direction as to increase a direction between the plunger 15 and the stator 16.

The shaft 21 according to embodiment 1 is fixed into a center hole 15a of the plunger 15 by means of press-fit or the like and moves together with the plunger 15. The shaft 21 may be fixed to the spool 12 and contact the plunger 15 or may contact both the spool 12 and the shaft 21.

The spring 22 according to the first embodiment is disposed at the left end of the spool 12 in FIG. 1B and presses the plunger 15 and the stator 16 to the right in FIG. 1B.

When the coil 17 is turned off in the OCV 2, the spool 12 and the plunger 15 are pressed by the spring 22 and move to the right in FIG. 1B until stopped.

This stop state is used to determine the maximum value of the magnetically attracting gap MG and position the spool 12 with reference to the sleeve 11.

The reference numeral 24 in FIG. 1B denotes an O-ring for sealing.

The ECU 4 controls a duty ratio to control the amount of current supplied to the coil 17 of the electromagnetic actuator 13 (hereafter referred to as the supply current amount). Controlling the supply current amount for the coil 17 linearly controls axial positions of the spool 12. This causes the advance chamber 7a and the delay chamber 7b to generate working oil pressures according to engine operation states, controlling camshaft's advance angles.

When advancing the camshaft according to vehicle's operation states, the ECU 4 increases the supply current amount for the coil 17. The magnetism generated by the coil 17 also increases to move the plunger 15 and the spool 12 to the left (advance side) in FIG. 1B. This increases not only the communication ratio between the oil pressure supply port 11b and the advance chamber communicating port 11c, but also the communication ratio between the delay chamber communicating port 11d and the drain port 11e. As a result, the oil pressure for the advance chamber 7a increases. On the contrary, the oil pressure for the delay chamber 7b decreases. The vane rotor 6 moves to the advance side relatively to the shoe housing 5 to advance the camshaft.

When delaying the camshaft according to vehicle's operation states, the ECU 4 decreases the supply current amount for the coil 17. The magnetism generated by the coil 17 also decreases to move the plunger 15 and the spool 12 to the right (delay side) in FIG. 1B. This increases not only the communication ratio between the oil pressure supply port 11b and the delay chamber communicating port 11d, but also the communication ratio between the advance chamber communicating port 11c and the drain port 11e. As a result, the oil pressure for the delay chamber 7b increases. On the contrary, the oil pressure for the advance chamber 7a decreases. The vane rotor 6 moves to the delay side relatively to the shoe housing 5 to delay the camshaft.

The OCV 2 is fixed to the engine E as follows. As shown in FIG. 1B, the spool valve 10 is inserted into the sleeve insertion hole E1 formed in the engine E. The bracket 14 welded to the side of the yoke 18 is tightened to the engine E by means of the tightening member 25 such as a screw and a rivet.

The oil pressure or the like given to the oil pressure supply port 11b applies a force to the spool valve 10 in such a direction as to be removable from the sleeve insertion hole E1. Accordingly, the weld A between the bracket 14 and the yoke 18 needs to fully withstand the force in the extraction direction.

To ensure the strength of the weld A for withstanding the force in the extraction direction, all the OCVs 2 to be manufactured need to be handled without destroying the weld A. However, the reliability is affected and costs increase when the valves are handled to ensure strength of the weld A.

When the bracket 14 is tightened to the engine E by means of the tightening member 25, the weld A may be detached to move the OCV 2 in such a direction as to be removed from the sleeve insertion hole E1. In consideration of this, the first embodiment provides the bracket 14 with the stopper contact portion that contacts with part of the electromagnetic actuator 13 to prevent the OCV 2 from being removed.

The bracket 14 is a metal fixture that is made of a metal plate such as iron punched out into a specified shape and is bent into a specified shape. The bracket 14 has a part along the surface of the engine E and another part welded to the yoke 18 along the outer periphery of the yoke 18.

The stopper contact portion will be described below.

The first embodiment provides a recess α (e.g., a hole piercing through the inside and the outside of the yoke 18) in the side of the yoke 18 covered by the bracket 14. A protrusion β to be inserted into the recess α is formed on the bracket 14 covering the recess α. The protrusion β is formed by stamping or similar operation while simultaneously forming the bracket 14.

When the OCV 2 moves in the direction for extraction, the protrusion β formed on the bracket 14 contacts (interferes) with the inside periphery of the recess α to prevent the extraction. The protrusion β formed on the bracket 14 constructs the stopper contact portion (the protrusion β being equivalent to the stopper contact portion according to the first embodiment).

The OCV 2 is so structured that the protrusion β formed on the bracket 14 is inserted into the recess α formed in the yoke 18. The construction solves a problem of enlarging the external shape of the OCV 2 including the bracket 14.

Figure 7:
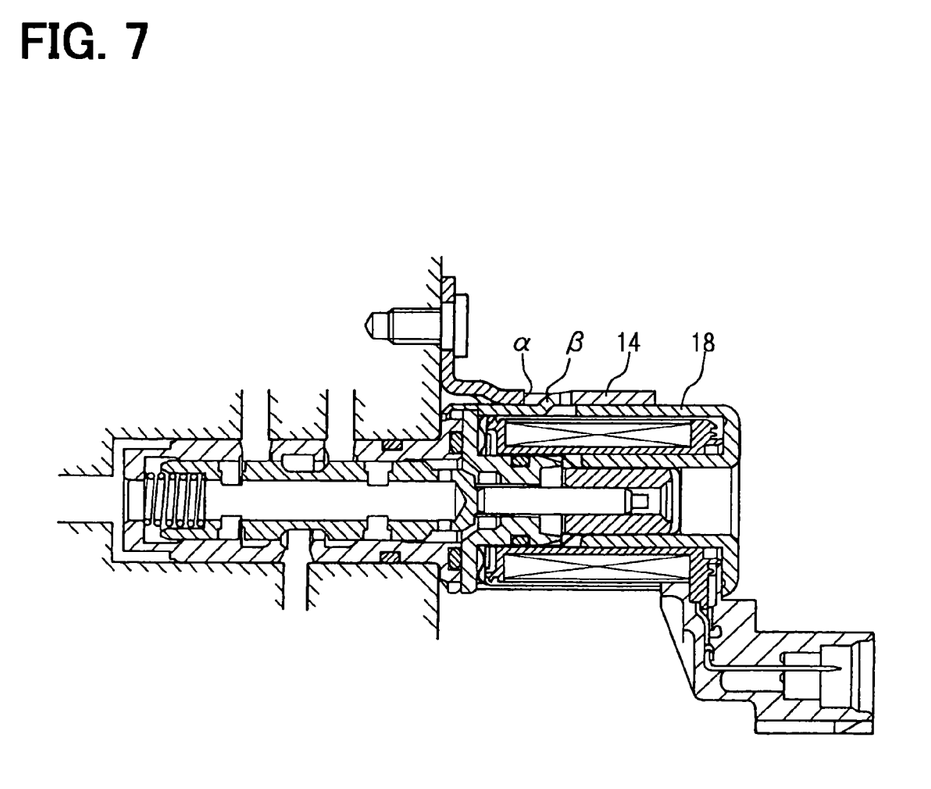
FIG. 7 is a cross-sectional side view of a fourth embodiment of the electromagnetic spool valve of FIG. 1A.

Contrary to the first embodiment, the following construction may be available, as shown in FIG. 7. The recess α is formed in the bracket 14 along the side of the yoke 18. The protrusion β is formed to be inserted into the recess α at the side of the yoke 18. The recess α formed on the bracket 14 provides the stopper contact portion (the recess α being equivalent to the stopper contact portion according to the modification). This construction also solves the problem of enlarging the external shape of the OCV 2 including the bracket 14.

When the yoke 18 and the bracket 14 are welded, the protrusion β is provided at a position to prevent contact with the yoke 18. When the bracket 14 and the yoke 18 are resistance-welded, gaps are formed between the yoke 18 and the protrusion β at both sides of the protrusion β along its axial and peripheral directions as shown in FIG. 1A.

This construction prevents a split welding current from flowing into the yoke 18 through the protrusion β when the yoke 18 and the bracket 14 are resistance-welded, making it possible to prevent a welding failure.

Of gaps between the protrusion β and the yoke 18, the axial gap toward the spool valve determines contact distance L1 for the recess α to contact with the protrusion β after removal of the weld A with the bracket 14 tightened to the engine E.

An O-ring 24 is attached to a seal groove 11f on the outer periphery of the sleeve 11 toward the electromagnetic actuator. The O-ring 24 prevents oil from leaking from between the sleeve 11 and the engine E.

The contact distance L1 is configured to be shorter than a seal distance L2 (L1<L2). The seal distance L2 is measured between an axial sidewall of the seal groove 11f and an axial opening of the sleeve insertion hole E1 with the OCV 2 assembled to the engine E (i.e., with the bracket being tightened to the engine E and the weld A being connected to the yoke 18).

According to this construction, the protrusion β interferes with the recess α as shown in FIG. 2 if the weld A is removed between the yoke 18 and the bracket 14. The O-ring 24 in the seal groove 11f stays in the sleeve insertion hole E1, making it possible to prevent the oil supplied to the spool valve 10 from leaking from the sleeve insertion hole E1.

Further, according to the first embodiment, the contact distance L1 is shorter than a distance L3 (L1<L3). The distance L3 (hereafter referred to as the overlapping aperture distance) indicates an axial length overlapping between apertures for the input/output ports (the advance chamber communicating port 1c, the delay chamber communicating port 11d, and the drain port 11e) formed on the side of the sleeve 11 and the oil pressure channels E2 on the engine.

According to this construction, the protrusion β interferes with the recess α as shown in FIG. 2 if the weld A is removed. This ensures a communicating state between the input/output ports (the advance chamber communicating port 11c, the delay chamber communicating port 11d, and the drain port 11e) on the sleeve 11 and the oil pressure channels E2 on the engine. The function of the OCV 2 can be ensured.

As mentioned above, the bracket 14 according to the first embodiment, when tightened to the engine E, may be removed from the weld A for some causes such as oil pressure, vibration, and external load which may cause the OCV 2 to be removed from the sleeve insertion hole E1. In such a case, the protrusion β (stopper contact portion) of the bracket 14 contacts with the recess α (part of the electromagnetic actuator 13) of the yoke 18 to prevent the OCV 2 from being removed.

Even if the bracket 14 tightened to the engine E is removed from the weld A, the function of the OCV 2 can be ensured for the following reasons. (1) The protrusion β (stopper contact portion) of the bracket 14 interferes with the electromagnetic actuator 13 (the recess α of the yoke 18), thereby preventing the OCV 2 from being removed from the sleeve insertion hole E1. (2) The O-ring 24 in the seal groove 11f stays in the sleeve insertion hole E1, preventing oil from leaking from the sleeve insertion hole E1. (3) Overlapping apertures are ensured between the input/output ports (the advance chamber communicating port 11c, the delay chamber communicating port 11d, and the drain port 11e) on the sleeve 11 and the oil pressure channels E2 on the engine.

It becomes possible to not only ensure high reliability for fixing the OCV 2 to the engine E, but also suppress costs required for management of welding strength between the yoke 18 and the bracket 14.

As mentioned above, even if the weld A is removed from between the bracket 14 and the yoke 18, the OCV 2 according to the first embodiment is robust enough to prevent failures due to the protrusion β of the bracket 14 to interfere with part of the electromagnetic actuator 13. The VVT can increase its reliability by using the technology of the excellent OCV 2.

Figure 4:
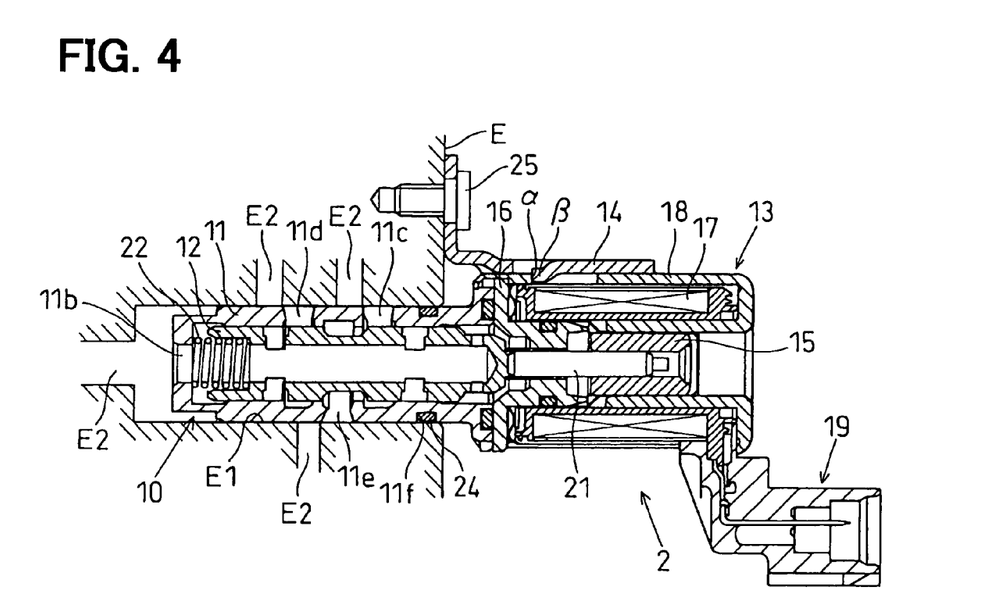
FIG. 4 is a cross-sectional side view of a second embodiment of the electromagnetic spool valve of FIG. 1A in a state where a protrusion contacts with a recess.

A second embodiment of the present invention will be described with reference to FIG. 4. Elements of the second embodiment that correspond to elements of the first embodiment are designated by the same reference numerals.

A stated above, the first embodiment described above has shown the example of configuring the contact distance L1 to be shorter than the overlapping aperture distance L3 (L1<L3).

Contrary to this, the second embodiment configures the contact distance L1 to be longer than the overlapping aperture distance L3 (L1>L3). In the second embodiment also, the contact distance L1 is shorter than the seal distance L2 (L1<L2).

In this construction, it is considered that the weld A is removed with the bracket 14 tightened to the engine E. Due to oil pressure applied to the spool valve 10 from the oil pump 9, the OCV 2 moves in a removable direction until the protrusion β (the stopper contact portion) contacts with the recess α (part of the electromagnetic actuator 13) of the yoke 18. When the weld A is removed, the OCV 2 moves in the removable direction. The protrusion β (the stopper contact portion) contacts with the recess α (part of the electromagnetic actuator 13) of the yoke 18 to stop the removal.

This state disconnects the communication between the input/output ports (the advance chamber communicating port 1c, the delay chamber communicating port 11d, and the drain port 11e) on the sleeve 11 and the oil pressure channel E2 on the engine. The function of the OCV 2 stops.

When the function of the OCV 2 stops, VVT operations become erratic to activate a VVT error detection system installed on a vehicle. A vehicle's driver is notified of the VVT error by means of an alarm indicator (OBD) and the like. The error detection system operates the alarm to make it possible to fast detect removal of the weld A.

Figure 5:
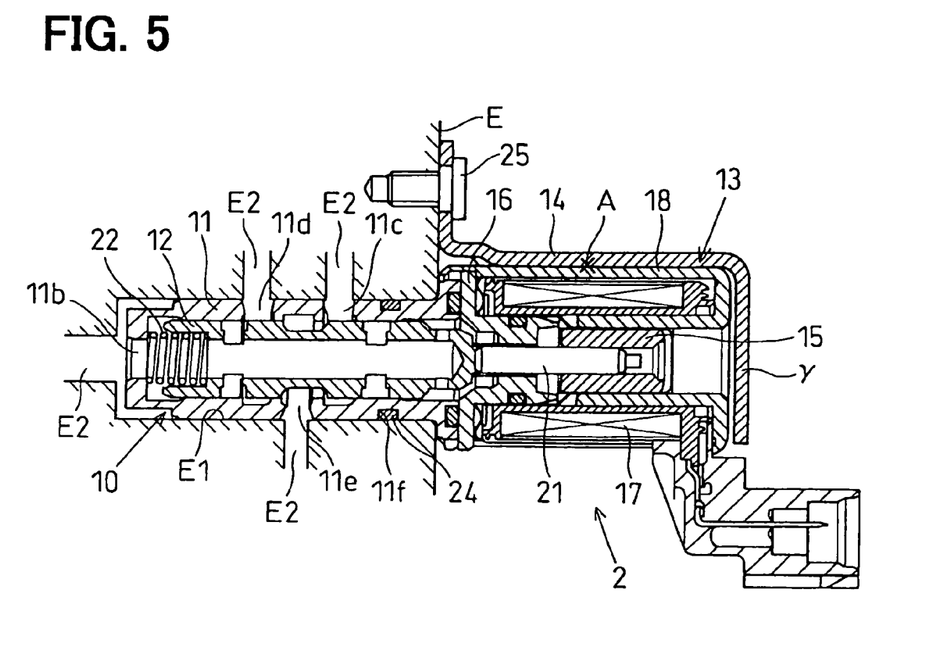
FIG. 5 is a cross-sectional side view of a third embodiment of the electromagnetic spool valve of FIG. 1A.

A third embodiment will now be described with reference to FIG. 5. The third embodiment provides the bracket 14 with a rear extension γ that covers the rear (the other side than the spool valve 10 along the axial direction) of the electromagnetic actuator 13.

It is considered that the weld A is removed with the bracket 14 tightened to the engine E and the OCV 2 moves in the removable direction. The rear extension γ contacts with the rear of the electromagnetic actuator 13 to prevent the removal thereof. The rear extension γ constructs the stopper contact portion (the rear extension γ functioning as the stopper contact portion in the third embodiment).

Since the rear extension γ constructs the stopper contact portion, the electromagnetic actuator 13 need not be modified allowing for costs for the OCV 2 to be suppressed.

The VCT 1 presented in the above-described embodiments is used as an example of describing the embodiments and may be otherwise constructed if the construction provides the advance adjustment by using the hydraulic actuator in the VCT 1.

According to the above-described embodiments, for example, three recesses 7 are formed in the shoe housing 5 and three vanes 6a are provided for the outer periphery of the vane rotor 6. According to the construction, it just needs to use one or more recesses 7 and vanes 6a. The number of recesses 7 and vanes 6a may be specified otherwise.

In the above-mentioned example, the shoe housing 5 rotates synchronously with the crankshaft and the vane rotor 6 rotates integrally with the camshaft. The vane rotor 6 may rotate synchronously with the crankshaft. The shoe housing 5 may rotate integrally with the camshaft.

While the above-mentioned embodiments show the examples of using the cylindrical spool 12, the structure of the spool 12 is not limited. For example, it may be preferable to use a spool having a plurality of large and small diameters.

The above-described embodiments show the examples of providing the oil pressure supply port 11b at the tip of the sleeve 11. The oil pressure supply port 11b may be provided on the side of the sleeve 11 to prevent oil pressure generated by the oil pump 9 from being actively forced out in the direction of removal from the OCV 2.

In the above-described embodiments, holes are formed in the side of the sleeve 11 to provide the input/output ports (the advance chamber communicating port 11c, the delay chamber communicating port 11d, the drain port 11e, and the like in the embodiments). The structure of the sleeve 11 is not limited. For example, it may be preferable to provide a plurality of input/output ports by forming holes that pierce through the sleeve 11 in diametric directions.

In the above-described embodiments, the structure of the electromagnetic actuator 13 is used as an example of explaining the embodiments. The electromagnetic actuator 13 may be structured otherwise. For example, the plunger 15 may be disposed along the axial direction of the coil 17.

The above-described embodiments have shown the example where the spool 12 moves away from the coil 17 when the coil is turned on. On the contrary, the spool 12 may move toward the coil 17 when the coil is turned on.

According to the above-described embodiments, the present invention is applied to the OCV 2 combined with the VCT 1. The present invention can be applied to OCVs used for automatic transmission's hydraulic controllers and all OCVs that start or stop supplying oil and change oil-flows.

The present invention can be also applied to all electromagnetic spool valves that start or stop supplying fluid (air, gas, and the like) other than oil and change fluid flows.

What is claimed is:

1. An electromagnetic spool valve comprising:
    a spool valve including a substantially cylindrical sleeve with an input/output ports for fluid to flow through and a spool axially slidably supported in the sleeve;
    an electromagnetic actuator fixed to the spool valve for axially driving the spool; and
    a bracket welded to a yoke of the electromagnetic actuator,
    wherein the spool valve is disposed in a sleeve insertion hole formed in a fixing member and is fixed to the fixing member by a tightening member tightening the bracket to the fixing member; and
    wherein one of the bracket and the electromagnetic actuator is provided with a stopper contact portion for contacting a part of the other of the bracket and the electromagnetic actuator for preventing the spool valve from being removed from the sleeve insertion hole when the bracket is tightened to the fixing member and is unwelded from the yoke.

2. The electromagnetic spool valve according to claim 1, wherein a seal groove is formed on an outer periphery of the sleeve and receiving a sealing member for sealing between the sleeve and the sleeve insertion hole,
    wherein the bracket is tightened to the fixing member and, when unwelded from the yoke, leaves a contact distance for the electromagnetic spool valve to travel relative to the fixing member until being stopped by the stopper contact portion, and
    wherein the contact distance is shorter than a seal distance defined between an axial sidewall of the seal groove and an axial opening of the sleeve insertion hole when the bracket is tightened to the fixing member and remains welded to the yoke.

3. The electromagnetic spool valve according to claim 1, wherein the bracket is tightened to the fixing member and, when unwelded from the yoke, leaves a contact distance for the electromagnetic spool valve to travel relative to the fixing member until being stopped by the stopper contact portion, and
    wherein the contact distance is shorter than an axially overlapping length of apertures for the input/output ports formed on the sleeve side and an internal channel on the fixing member side.

4. The electromagnetic spool valve according to claim 1, wherein the bracket is tightened to the fixing member and, when unwelded from the yoke, leaves a contact distance for the electromagnetic spool valve to travel relative to the fixing member until being stopped by the stopper contact portion; and
    wherein the contact distance is longer than an axially overlapping length of apertures for the input/output port formed on the sleeve side and an internal channel on the fixing member side.

5. The electromagnetic spool valve according to claim 1, further comprising:
    a recess formed on a side of the yoke and the stopper contact portion includes a protrusion formed on the bracket along the side of the yoke received by the recess.

6. The electromagnetic spool valve according to claim 1, further comprising:
    a recess formed on the bracket along a side of the yoke and the stopper contact portion includes a protrusion formed on the side of the yoke received by the recess.

7. The electromagnetic spool valve according to claim 1, wherein the stopper contact portion includes a rear extension provided on the bracket that covers at least a part of the electromagnetic actuator that is disposed opposite from the spool valve.

8. The electromagnetic spool valve according to claim 1, wherein the stopper contact portion is provided at a position preventing electrical conductivity between itself and the yoke when the yoke is welded to the bracket.

9. The electromagnetic spool valve according to claim 1, wherein
    the spool valve includes an oil-flow control valve that controls oil pressure supply destinations and supply pressures, the oil-flow control valve comprising:
    a rotatably driving portion rotatably driven in synchronization with a crankshaft of an internal combustion engine; and
    a rotatably driven portion which is rotatably provided relatively to that rotatably driving portion and rotates integrally with the camshaft of the internal combustion engine,
    wherein the oil-flow control valve is combined with a variable valve timing mechanism that applies oil pressure to an advance chamber formed between the rotatably driving portion and the rotatably driven portion, moves the camshaft to an advance side together with the rotatably driven portion in response to the rotatably driving portion, applies oil pressure to a delay chamber formed between the rotatably driving portion and the rotatably driven portion, and moves the camshaft together with the rotatably driven portion to a delay side in response to the rotatably driving portion, and
    wherein the oil-flow control valve allows the advance chamber and the delay chamber to relatively apply or exhaust oil pressure generated from an oil pressure source during an operation of the internal combustion engine.

* * * * *